(12) United States Patent
Benkler

(10) Patent No.: US 7,614,647 B2
(45) Date of Patent: Nov. 10, 2009

(54) VEHICLE BODY

(75) Inventor: Olaf Benkler, Neuhausen/Schellbronn (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/138,368

(22) Filed: Jun. 12, 2008

(65) Prior Publication Data

US 2008/0309054 A1 Dec. 18, 2008

(30) Foreign Application Priority Data

Jun. 14, 2007 (DE) ........................ 10 2007 027 324

(51) Int. Cl.
*B60R 21/20* (2006.01)
(52) U.S. Cl. .................................. 280/728.3
(58) Field of Classification Search .............. 280/728.3, 280/730.2
See application file for complete search history.

(56) References Cited

U.S. PATENT DOCUMENTS 6,616,219 B2 9/2003 Benkler

2007/0241542 A1* 10/2007 Wallace .................... 280/730.2

FOREIGN PATENT DOCUMENTS

| DE | 103 41 641 B4 | 5/2006 |
| EP | 1 216 891 B1 | 6/2002 |

* cited by examiner

*Primary Examiner*—Faye M. Fleming
(74) *Attorney, Agent, or Firm*—Gerald E. Hespos; Anthony J. Casella

(57) ABSTRACT

A vehicle body of a motor vehicle includes side members. Each side member exhibits pillars, to which a pillar covering is assigned. A roof side member extends above the pillars of each side member. In the region of the roof side member, ahead airbag, which, when triggered in the region of the C pillar, impinges on the C pillar covering assigned to the C pillar, opens the C pillar covering along a desired opening line formed by a material recess. The head airbag is assigned a catch strap, where one end of the catch strap engages with the head airbag, and the opposite end of the catch strap engages with the C pillar. The C pillar, or a component, adjacent to the C pillar, is assigned a guide element, which is intended for the head airbag as well as the catch strap, and which, on triggering the head airbag, guides this head airbag as well as the catch strap.

7 Claims, 4 Drawing Sheets

VEHICLE BODY

CROSS-REFERENCE TO RELATED APPLICATION

This application claims the priority of German Application No. 10 2007 027 324.1, filed Jun. 14, 2007, the disclosure of which is expressly incorporated by reference herein.

BACKGROUND AND SUMMARY OF THE INVENTION

The invention relates to a vehicle body and, in particular, to a motor vehicle body having side members, each side member exhibiting pillars, to which a pillar cladding is assigned. A roof side member extends above the pillars of each side member. In the region of the roof side member, a head airbag is assigned, which, when triggered in the region of the C pillar, impinges on the C pillar cladding assigned to the C pillar, and opens the C pillar cladding along a desired opening line, formed by a material recess.

From DE 103 41 641 A1, there is known a vehicle body of a motor vehicle, which exhibits side members with A pillars, B pillars, C pillars and D pillars. A roof side member extends above the pillars of each side member. Each pillar is assigned a pillar cladding. In the area of each roof side member there is a head airbag, which, when triggered, opens the pillar cladding along a desired opening line and/or bending line, which is formed by a material recess.

EP 1 216 891 B1 discloses an additional vehicle body of a motor vehicle, which includes a deformation element in the region of a B pillar, in order to guide in a defined manner a head airbag, which extends in the region of a roof side member, when the head airbag is triggered and, in so doing, is unfolded. Therefore, the disclosed deformation element, which is assigned to the B pillar, exhibits a ramp member with an inclined plane. In this case, the inclined plane of the ramp member defines a direction for the head airbag, so that, when the head airbag is triggered and, thus, when it unfolds, it can be guided into an optimal position relative to the head of an occupant.

The above solutions, known from the state of the art, already offer good guidance for a head airbag when it is triggered and/or unfolded in the region of the B pillar, as well as the D pillar. However, to date there are no known solutions, which make possible a good guidance of the head airbag in the region of the C pillar.

Against this background, the object of the present invention is to provide a novel vehicle body. This object is achieved by improving the aforementioned vehicle body. According to the invention, the head airbag is assigned a catch strap. In this case, one end of the catch strap engages with the head airbag, and the opposite end of the catch strap engages with the C pillar. Here, the C pillar (or a component, adjacent to the C pillar), is assigned a guide element, which is intended for the head airbag as well as the catch strap, and which, on triggering the head airbag, guides this head airbag as well as the catch strap.

Within the scope of the present invention, when the head airbag is triggered and, in so doing, unfolded, the head airbag is guided in the region of the C pillar by way of the catch strap as well as by way of the guide element. The catch strap engages, on the one side, with the head airbag and, on the other side, with the C pillar and clamps the head airbag, when triggered/unfolded, i.e., deployed, in a predefined position. The guide element serves to guide the head airbag as well as the catch strap when the head airbag is triggered and, thus, unfolded, in order to prevent the head airbag from jamming or snagging when triggered/unfolded.

Other objects, advantages and novel features of the present invention will become apparent from the following detailed description when considered in conjunction with the accompanying drawings.

DETAILED DESCRIPTION OF THE DRAWINGS

The present invention described herein relates to a vehicle body of a passenger motor vehicle. This type of vehicle body usually includes two side members, which exhibit a plurality of pillars, and a roof side member which extends above the pillars.

Figure 1:
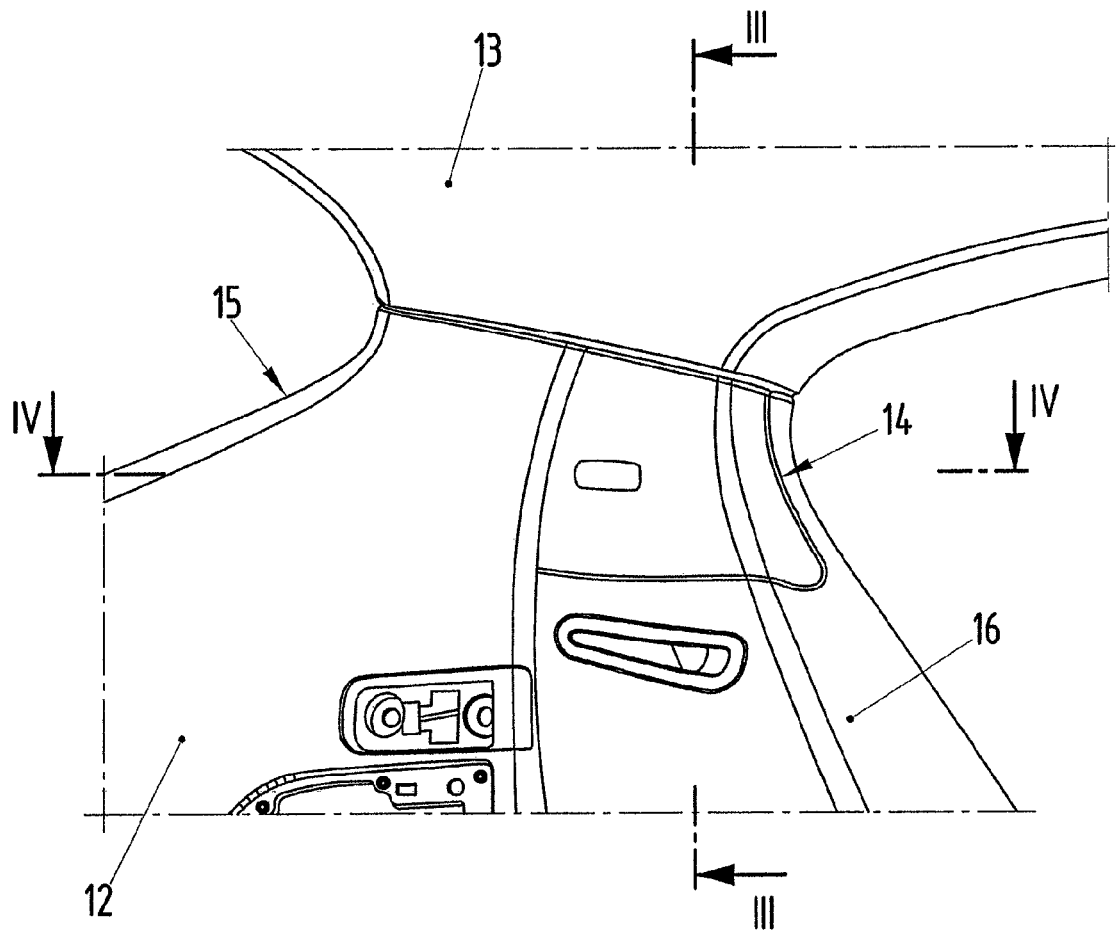
FIG. 1 is a detail of an inventive vehicle body in the region of a C pillar, together with a C pillar covering and an adjacent wheel house covering.
Figure 2:
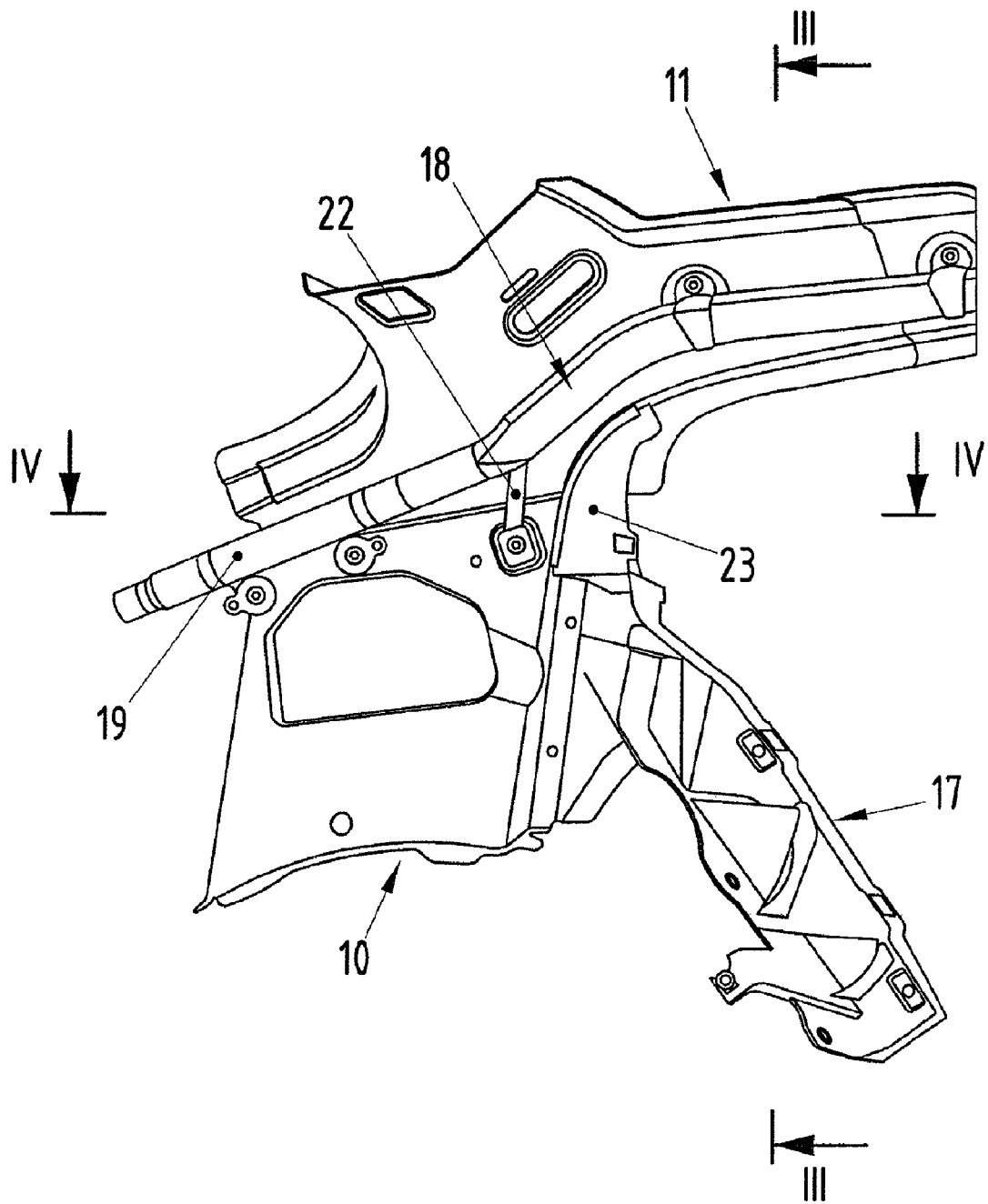
FIG. 2 is a detail from FIG. 1 without the C pillar covering and without the adjacent wheel house covering.
Figure 3:
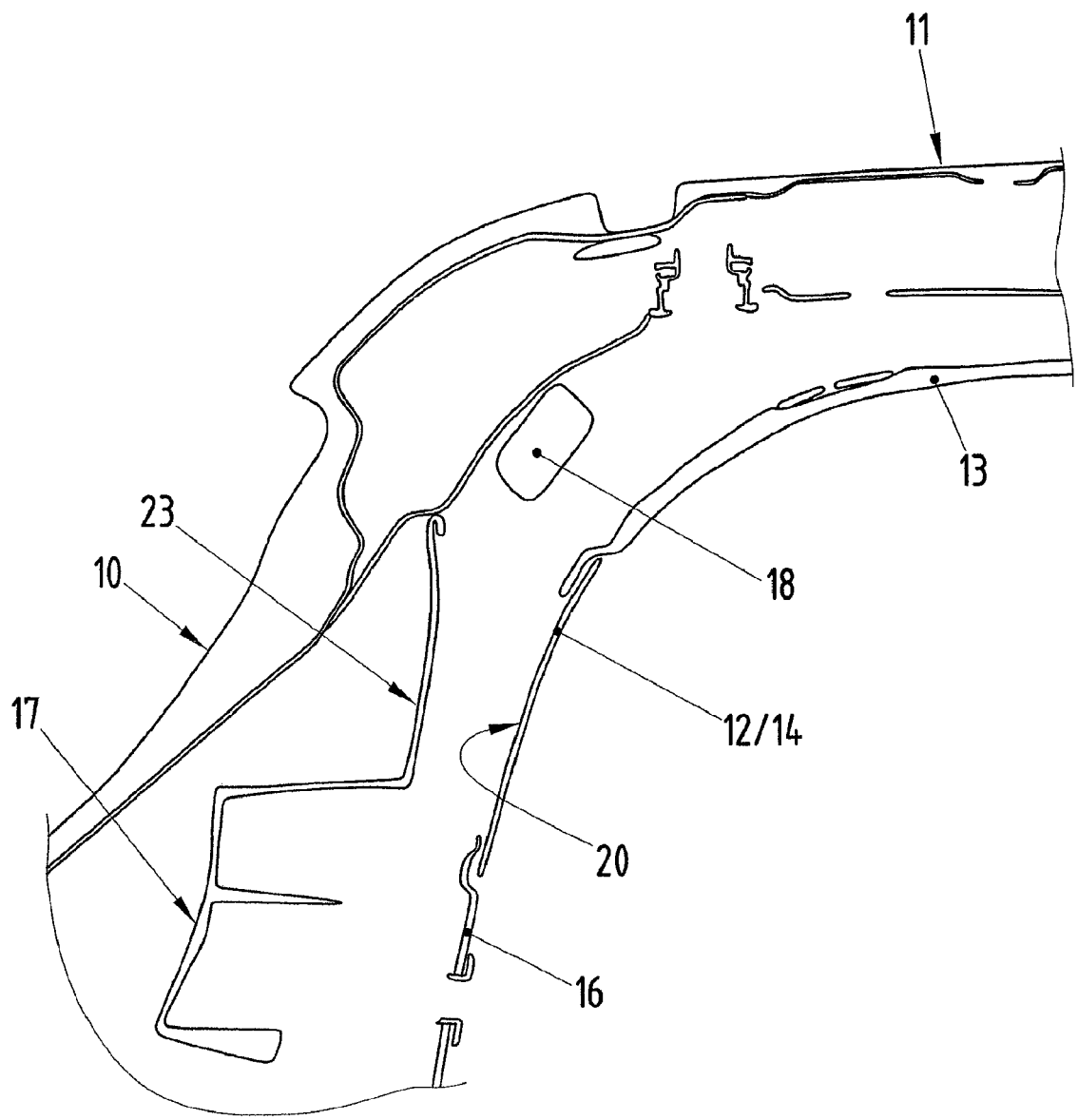
FIG. 3 is a cross sectional view of the detail from FIGS. 1 and 2, taken along intersection line III-III.

FIGS. 1 and 2 show a detail of an inventive vehicle body in the region of a C pillar 10 and a roof side member 11, which roof side member 11 extends above the C pillar 10. In FIG. 1, the C pillar 10 is covered by a C pillar covering or cladding 12; and the roof side member 11 is covered by a molded headliner 13. Therefore, FIGS. 1 and 2 depict a detail, taken from the inventive vehicle body, as seen from the interior of the motor vehicle.

The C pillar covering 12 has a front covering section 14 and a rear covering section 15. In this case, a so-called wheel house covering or cladding 16 extends below the front covering section 14 of the C pillar covering. The wheel house covering 16 is fastened to a wheel house covering holder 17, which is shown in FIG. 2.

Figure 4:
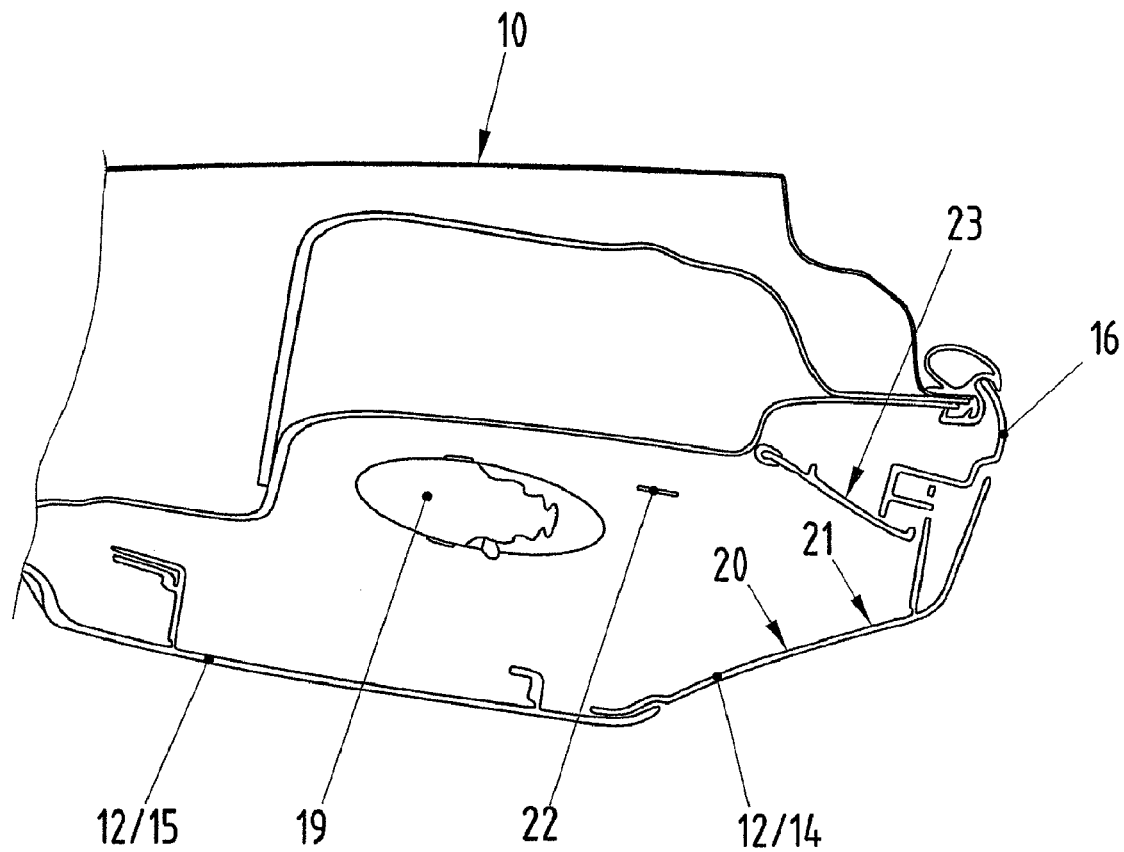
FIG. 4 is an additional cross sectional view of the detail from FIGS. 1 and 2, taken along intersection line IV-IV.

According to FIG. 2, a head airbag 18 extends in the region of the roof side member 11, as well as in the region of the C pillar 10. The head airbag 18 may be triggered or ignited by a gas generator 19 and, thus, may unfold. On triggering and/or unfolding of the head airbag 18, the head airbag 18 impinges on an inner surface 20 of the front covering section 14 of the C pillar covering 12 and opens the covering section 14 along a desired opening line 21, formed by a material recess (see FIG. 4).

Within the scope of the present invention, described here, the head airbag 18 is assigned a catch strap 22. In this case, one end of the catch strap 22 engages with the head airbag 18, and the opposite end of the catch strap engages with the C pillar 10. That is, the catch strap 22 is connected in an articulated manner with its corresponding ends to the head airbag 18 and/or the C pillar 10. When the head airbag 18 is triggered and then unfolded, the head airbag is clamped in a precisely predefined position with the aid of the catch strap 22. Then, the catch strap 22 is rotated clockwise by approximately 90 deg. in relation to the position (shown in FIG. 2), in which the head airbag 18 is not triggered.

In order to prevent the head airbag 18 and the catch strap 22 from snagging and/or jamming when triggered, and then unfolded, the inventive vehicle body has an additional guide element 23. In the illustrated embodiment, the guide element 23 is assigned to the wheel house covering holder 17. The guide element 23 provides a sliding surface and/or ramp plane for the head airbag 18, as well as the catch strap 22, in the region of the C pillar 10, in order to prevent the head airbag from jamming or snagging in the region of the C pillar when the head airbag is triggered and, in so doing, unfolded.

In the illustrated embodiment, the guide element 23 is assigned to the wheel house covering holder 17, which is located adjacent to the C pillar 10. In contrast, it is also possible to assign the guide element directly to the C pillar 10 or to another component adjacent to the C pillar 10.

| Table of Reference Numerals | |
|---|---|
| 10 | C pillar |
| 11 | roof side member |
| 12 | C pillar covering (cladding) |
| 13 | molded headliner |
| 14 | front covering section |
| 15 | rear covering section |
| 16 | wheel house covering (cladding) |
| 17 | wheel house covering holder |
| 18 | head airbag |
| 19 | gas generator |
| 20 | inner surface |
| 21 | desired opening line |
| 22 | catch strap |
| 23 | guide element |

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle body, comprising:
   side members, each side member having at least a C pillar;
   a roof side member extending above the C pillar of each side member;
   a C pillar covering assigned to the C pillar;
   a head airbag assigned to a region of the roof side member such that, when triggered in a region of the C pillar, impinges on the C pillar covering assigned to the C pillar, and opens the C pillar covering along a desired rupture line;
   a catch strap to which the head air bag is assigned, one end of the catch strap engaging with the head airbag and an opposite end of the catch strap engaging with the C pillar;
   a guide element to which the C pillar or a component adjacent to the C pillar is assigned, said guide element guiding the head airbag and the catch strap upon triggering of the head airbag; and
   a wheel house covering holder, said guide element being assigned to the wheel house covering holder.

2. The motor vehicle body according to claim 1, wherein the guide element is operatively configured to prevent the head airbag from moving freely when the head airbag is deployed.

3. The motor vehicle body according to claim 2, further comprising:
   a wheel house covering assigned to the wheel house covering holder, wherein the guide element is arranged behind the wheel house covering; and
   further wherein the wheel house covering is arranged adjacent to the C pillar covering that is opened upon deployment of the head airbag.

4. The motor vehicle body according to claim 2, wherein the catch strap clamps the head airbag in a defined position when the head airbag is deployed.

5. The motor vehicle body according to claim 1, further comprising:
   a wheel house covering assigned to the wheel house covering holder, wherein the guide element is arranged behind the wheel house covering; and
   further wherein the wheel house covering is arranged adjacent to the C pillar covering that is opened upon deployment of the head airbag.

6. The motor vehicle body according to claim 5, wherein the catch strap clamps the head airbag in a defined position when the head airbag is deployed.

7. The motor vehicle body according to claim 1, wherein the catch strap clamps the head airbag in a defined position when the head airbag is deployed.

* * * * *